United States Patent Office 3,239,471
Patented Mar. 8, 1966

3,239,471
PRETREATMENT OF PELLETED ZEOLITES TO IMPROVE CRUSHING STRENGTH
Norman Chen-Hu Ch'in, Fullerton, Cloyd P. Reeg, Orange, and Daniel M. Waldorf, La Habra, Calif., assignors to Union Oil Company of California, Los Angeles, Calif., a corporation of California
No Drawing. Filed July 1, 1963, Ser. No. 292,140
5 Claims. (Cl. 252—455)

This invention relates to new methods for treating certain pelleted absorbent and/or catalyst compositions made up predominantly of crystalline, alumino-silicate, zeolites of the molecular sieve type, so as to increase and stabilize the mechanical strength thereof, i.e., their resistance to crushing and abrading forces. Most importantly, this strengthening and stabilizing is effected without significantly decreasing the pellet porosity. The invention is particularly concerned with molecular sieve catalysts of the Y crystal type, which, by virtue of their high silica/alumina ratio, high surface area, relatively uniform pore diameters, and low sodium content, are particularly useful as catalysts in hydrocracking and isomerization processes.

Briefly stated, the novel strengthening treatment of the invention comprises a three-step sequence wherein the pelleted catalyst or zeolite is first substantially hydrated by contact with moist air or water vapor, then substantially saturated with ammonia, and finally calcined at elevated temperatures above about 700° F. in air, hydrogen, nitrogen, or other atmosphere which will permit dehydration and deammoniation to take place without otherwise damaging the catalyst. The powdered precursors of such zeolites are often prepared in a hydrated and ammoniated form, but it has been the general practice to remove most of the water and ammonia before or during the pelleting operation, so that there is insufficient water and ammonia present during the subsequent final calcining to give maximum intercrystalline bonding required for pellet strength. It has apparently not been appreciated in the past that substantial dehydration and deammoniation should take place during calcination after the powdered zeolite has been compressed in tablet form; as a result, the tableted compositions previously prepared have been deficient in crushing strength, due apparently to insufficient bonding forces between the individual zeolite crystals. By the novel pretreatment process of this invention, the finished catalyst pellets are found to exhibit excellent mechanical strength, and moreover this strength is retained after long periods of use in hydrocarbon conversion processes, in sharp distinction to previously known molecular sieve zeolite pellets.

Modern catalytic processes, notably petroleum refining and coversion processes, require pelleted catalysts in the size range of about 1/16-inch to 1/2-inch in diameter, which are not only specifically active in the chemical reactions involved, but also possess physical characteristics required for successful operation. Of outstanding importance are bulk density, hardness or crushing strength, and resistance to attrition. The ability of a catalyst pellet to retain its shape and size notwithstanding the mechanical handling to which it is subjected in shipment, the loading and unloading of reactors, and the use therein, is an important requirement for a successful catalyst. Any substantial crumbling or breaking of catalyst during loading of reactors, or crushing brought about by the mere weight of the catalyst bed, can cause serious difficulties. Firstly, the presence of unevenly distributed fine particles in the catalyst bed can cause uneven channeling of fluid reactants traveling through the reactor, resulting in uneven contacting and conversion, and the development of "hot spots" in localized zones. These "hot spots" can be disastrous in exothermic processes such as hydrocracking, both from the standpoint of catalyst deactivation, and the development of uncontrollable runaways. Even where the fine particles are evenly distributed through the catalyst bed, other difficulties develop related to the pressure drop required to force the reactants through the reactor. It is the principal object of this invention to avoid the foregoing difficulties when using the specific molecular sieve zeolites of this invention.

The strengthening treatment of this invention is applicable to pelleted compositions made up either of the simple alumino-silicate zeolites themselves, or the modified zeolites containing other added components to impart additional catalytic activity. In particular, the treatment is useful for strengthening catalyst compositions containing added hydrogenating metals such as palladium, platinum, nickel, etc. It is also applicable to pellets composed of mixtures of the zeolites with other non-crystalline adjuncts such as alumina, silica, clay, etc.

The molecular sieve zeolites of this invention are synthetic alumino-silicates prepared in general by digesting aqueous solutions of sodium aluminate and sodium silicate at elevated temperatures. The resulting crystalline sodium alumino silicates may have $SiO_2/Al_2O_3$ mole-ratios between about 1 and 10, depending upon the temperature and pressure conditions during digestion, and the proportions of alumina, silica and sodium hydroxide in the mother liquor. A common characteristic of these zeolites is their relatively uniform crystal pore diameter, which may range, depending upon the $SiO_2/Al_2O_3$ ratio and the nature of the zeolitic cation present, between about 4 and 18 A. Many distinct crystal types of such zeolites have now been identified and reported in the literature, including for example the A, X, Y, L, S and T crystal forms.

The preferred zeolites of this invention comprise a relatively new class of materials having high $SiO_2/Al_2O_3$ ratios. Examples of such compositions are synthetic mordenite, with a silica/alumina ratio of about 10/1, and molecular sieves of the Y crystal type having a silica/alumina mole-ratio of about 2.5 to about 6. A common characteristic of these high-silica zeolites seems to be that they can be converted from their initial sodium form to an ammonium form by ion exchange with an ammonium salt, and the resulting ammonium form can then be heated at relatively high temperatures to form a hydrogen zeolite (sometimes referred to as being "decationized"), which hydrogen zeolite still displays a crystal structure substantially identical to that of the original sodium form. This is in sharp contrast to other zeolites having lower silica/alumina ratios; these materials can be converted to a hydrogen form by similar methods, but in so doing there is a substantially complete collapse of crystal structure.

In their sodium form, the general formula for the preferred Y molecular sieve zeolites of this invention is expressed as follows:

$$0.9 \pm 0.2 Na_2O : Al_2O_3 W SiO_2 X H_2O$$

where $X=0$ to about 9, and $W=2.5$ to about 6. Sodium zeolites of this nature, and methods for their preparation are described in Belgian Patents Nos. 577,642, 598,582, 598,682, 598,683 and 598,686. The Y sieve zeolites having a $SiO_2Al_2O_3$ mole-ratio of about 2.5 to 3.9 can be prepared by methods described in Belgian Patent No. 577,642, which in general involves digesting aqueous solutions of sodium silicate and sodium aluminate at elevated temperatures, following an initial low-temperature aging treatment. A more desirable form of the Y zeolite, having a $SiO_2/Al_2O_3$ mole-ratio of about 4 to 6, can be prepared by methods described in Belgian Patent No. 598,582, which involves essentially an initial, low-temperature aging of a mixture of silica hydrosol, sodium hydroxide and sodium aluminate, followed by a high-temperature digestion to effect crystallization of the sodium zeolite. Sodium zeolites prepared by either of these methods can be converted to crystalline hydrogen zeolites by ammonium ion-exchange followed by heating.

The process of this invention is applicable not only to the zeolites which have been converted, or partially converted, to hydrogen forms, but also to those wherein the zeolite cations are wholly or partially metallic ions, e.g., sodium, magnesium, calcium, zinc, etc. In particular, it is applicable to mixed zeolitic forms of the zeolite wherein for example most of the sodium is first replaced with ammonium ion, and then the resulting ammonium zeolite is back-exchanged with other metal salt solutions, preferably divalent metal salts such as magnesium or calcium salts, to prepare a mixed metal-ammonium zeolite which may then be calcined to form a mixed hydrogen-divalent metal zeolite. The preferred zeolites are those wherein at least about 10% of the ion-exchange capacity thereof is satisfied by hydrogen ions, and at least about 10% by a divalent metal.

To prepare active hydrocracking or isomerization catalysts from zeolites of the foregoing type, it is necessary to incorporate a minor proportion of a suitable metal hydrogenating component, e.g., a Group VIII metal. The preferred hydrogenating metals comprise the Group VIII noble metals, and particularly palladium, platinum or rhodium. To incorporate these metals by ion-exchange, the zeolite, preferably in an ammonium form, is digested with an aqueous solution of a suitable compound of the desired metal wherein the metal is present in a cationic form. This procedure is described more specifically in Belgian Patent No. 598,686. The metal-ammonium zeolite is then subjected to final calcining and activation in order to convert the remaining ammonium ions to hydrogen ions.

In preparing pelleted catalysts from the foregoing zeolitic raw materials, it has in the past been the normal practice to remove most of the water from the wet, microcrystalline zeolitic precipitate, as recovered from the final ion-exchange step, by heating at relatively low temperatures in air. This partial drying produces a sensibly dry powder, which contains only about 10–20% by weight of water, and will flow readily through the feeding mechanism of conventional tableting machines. The powder at this point may also contain zeolitic ammonium ion, although some of the chemisorbed ammonia has undoubtedly been removed during the drying step. This partially dried and partially deammoniated composition is then compressed strongly into the usual dies of a tableting machine, and during this operation a further drying and deammoniation of the zeolite takes place due to the heat developed in the tableting dies. The pellets so prepared are then subjected to a final calcining in dry air at about 800–900° F. for several hours to complete the activation by drying. In the case of the ammonium zeolites, the remaining ammonium ions are simultaneously decomposed, forming a hydrogen zeolite. The final water content of the catalyst is normally below about 1% by weight.

Catalysts prepared in this conventional manner sometimes display a high initial crushing strength, indicating satisfactory commercial qualities. These initial crushing strengths are deceiving however because they are not stable; the intercrystalline bonding forces appear to be easily destroyed by subsequent treatments normally encountered in using the catalyst for hydrocarbon conversions. For example, catalysts having an initial crushing strength of about 20 pounds per pellet have been found to display a crushing strength of only 8–9 pounds per pellet after several hours usage in a hydrocracking process carried out at 600–650° F. A mere treatment with pure hydrogen at 700° F. for 2 hours has been found to lower the crushing strength of a catalyst from about 20 pounds to 12 pounds. (Crushing strengths are measured herein by placing an individual cylindrical pellet in axially horizontal position on a flat plate and measuring the total force in pounds required to crush the same, the force being applied from above through a disk bearing on the top surface of the pellet. Crushing strengths reported herein are average values obtained from crushing several pellets.)

Although the reasons for this instability are not clearly understood, it is believed, in view of the results obtained by the process of this invention, that inadequate intercrystalline bonding occurs during the calcining of the pelleted catalyst, due to the partial dehydration and/or deammoniation which occurred immediately prior to and during the pelleting operation. This is confirmed by the fact that catalysts from the same batches which were unstable as above-noted, can be stabilized by simply rehydrating to, e.g., about 25% by weight of water, then reammoniating to saturation, and recalcining at 700–900° F. for several hours. Not only does this treatment effect a stabilization of the initial pellet strength, but in most cases it actually effects an increase in crushing strength amounting to 25–30% or more. Moreover, this incremental increase in crushing strength is stable and is maintained even after extended use in hydrocracking under conditions which would have caused a marked decrease in strength of the initial catalyst.

The pretreatment process of this invention is therefore applicable to any of the crystalline zeolites or catalyst compositions which have become partially or completely dehydrated and/or deammoniated prior to the first calcining step following the pelleting operation. The terms "ammoniation" and "deammoniation" are intended to refer to the total adsorbent capacity of the zeolite for ammonia, whether by adsorption, chemisorption, ion-exchange, or solution in adsorbed water.

Very surprisingly, it has been found that the reverse order of treatment, wherein the zeolite is first ammoniated and then hydrated and calcined, gives no appreciable stabilization or increase in crushing strength, nor does mere rehydration followed by calcining, or reammoniation followed by calcining. It appears to be essential that the zeolite be first rehydrated to a water content of about 15–40% by weight or more (preferably 20–35%), then ammoniated to at least about 20% saturation, and preferably to substantially complete saturation, and then calcined for about 10 minutes to 20 hours at temperatures between about 650° and 1,200° F., and preferably between about 750° and 1,050° F. Rehydration is normally accomplished by simply exposing the zeolite to moist air for, e.g., 1–48 hours, and ammoniation is normally effected by treatment with gaseous ammoniat at room temperature for 1–12 hours. It is contemplated however that the rehydration and ammoniation can be conducted simultaneously by passing wet ammonia gas over the zeolite. Ammoniation can also be effected by treating the pellets with aqueous ammonia solutions.

From the foregoing, it is apparent that the rehydration and ammoniation treatment can be applied to the catalyst pellets either before or after the first calcining treatment following the pelleting operation. Since the initial predrying and pelleting operation always effects some degree of dehydration (and deammoniation if ammonium ions be present), substantial benefits accrue from rehydrating and reammoniating the pelleted catalyst before the initial calcination. However, even where the catalyst has already been calcined under unfavorable conditions of water and ammonia content, a substantial stabilization and improvement of crushing strength is obtained through a complete sequence of rehydration, reammoniation and recalcination.

The calcination treatment may be conducted in any gaseous atmosphere which does not damage the catalyst, and which will permit dehydration and deammoniation to take place. Suitable gaseous calcining media include nitrogen, hydrogen, air, argon, helium, etc. Operative calcining temperatures range between about 650° and 1,200° F., preferably between about 750–950° F. Suitable calcining times range between about 10 minutes and 20 hours, but normally effective strengthening is obtained in about 30 minutes to 2 hours. Atmospheric pressures are normally maintained throughout the rehydration, ammoniation and calcination treatments, although reduced pressures or superatmospheric may be employed if desired.

The following example is cited to illustrate more specifically certain strengthening treatments, but is not to be construed as limiting in scope:

*Example*

An initial Y molecular sieve zeolitic hydrocracking catalyst was prepared in the normal manner from a sodium Y sieve zeolite having a silica/alumina mole-ratio of about 4.7. This procedure consisted in subjecting the sodium zeolite to ion exchange with ammonium chloride solution to reduce the sodium content ($Na_2O$) to below about 2% by weight. The resulting wet ammonium zeolite was then partially back-exchanged with an aqueous magnesium sulfate solution until the magnesium content (MgO) was about 5% by weight. The resulting ammonium-magnesium zeolite was then further ion-exchanged with an aqueous solution of tetrammine palladium chloride to add 0.5% of zeolite palladium to the catalyst. The resulting ammonium-magnesium-palladium zeolite was then filtered off, drained, dried at below about 400° F. to a water content of about 16–20% by weight, and then compressed in a tableting machine to form ⅛″ pellets. During the pelleting operation, the tablets lost additional ammonia and water. The pelleted catalyst was then calcined in dry air for about 16 hours at 950° F. to activate the same and to convert the magnesium-ammonium zeolite to a magnesium-hydrogen zeolite wherein about 50% of the ion exchange capacity is satisfied by hydrogen ions. The resulting calcined pellets were found to have a crushing strength of 20 pounds per pellet, which crushing strength is adequate for use in commercial fixed-bed reactors.

The calcined catalyst prepared as above-described was then employed in a hydrocracking activity test for 160 hours, during which a gas oil feedstock was subjected to hydrocracking at about 650° F., 1,500 p.s.i.g., and in the presence of 8,000 s.c.f. of hydrogen per barrel of feed. At the end of the activity test, the catalyst was found to have a crushing strength of only 12.2 pounds per pellet. Upon regeneration of the used catalyst by conventional oxidation, the crushing strength was still only 13.1 pounds per pellet. These values are below what is required for successful commercial use and show excessive loss in strength through normal usage.

Another large sample of the initial catalyst pellets, having a crushing strength of 20 pounds per pellet, was then subjected to the strengthening pretreatment process of this invention. This consisted in exposing the catalyst to moist air for 24 hours, effecting full hydration to about 25% water content, and then passing ammonia gas thereover for 2½ hours at atmospheric pressure. The crushing strength of the catalyst at this point was 14.2 pounds per pellet. Following the rehydration and reammoniation, various samples of the rehydrated and reammoniated catalyst were subjected to different calcining treatments, and crushing strengths were again determined, with the following results:

TABLE 1

| Catalyst Sample | Calcining Treatment | Crushing Strength After Calcining, lb./pellet |
|---|---|---|
| 1 | 30 minutes at 70–920° F. under nitrogen; 90 minutes at 920° F. under hydrogen. | 25.0 |
| 2 | 80 minutes at 70–900° F.; 75 minutes at 900° F. under hydrogen. | 24.9 |
| 3 | 50 minutes at 70–810° F.; 30 minutes at 810° F.; under argon. | 28.8 |
| 4 | 25 minutes at 70–750° F.; 40 minutes at 750° F. under helium. | 26.8 |
| 5 | 30 minutes at 70–800° F.; 35 minutes at 800° F. under argon. | 26.0 |
| 6 | 40 minutes at 70–900° F.; 30 minutes at 900° F. under helium. | 26.1 |
| 7 | 35 minutes at 70–900° F.; 40 minutes at 900° F. under argon. | 25.1 |
| 8 | 40 minutes at 70–850° F.; 30 minutes at 850° F. under nitrogen. | 28.9 |
| 9 | 12 hours in air at 850–900° F. | 22.0 |

It will be observed that the calcining pretreatment effected a substantial improvement in crushing strength in all cases. Moreover, this crushing strength does not deteriorate substantially after use of the catalyst for at least 106 hours in hydrocracking. It is therefore evident that there was not only a substantial increase in initial crushing strength, but also a stabilization thereof against influences which caused a substantial weakening of the original catalyst in normal hydrocracking usage.

When other catalysts and adsorbents of this invention are subjected to the foregoing treatment, a substantially similar improvement in stability and crushing strength is obtained. It is therefore not intended that the invention should be limited to details described above since many variations may be made by those skilled in the art without departing from the scope or spirit of the following claims.

We claim:
1. A pretreatment method for improving and stabilizing the mechanical strength of a pelleted, molecular sieve alumino-silicate crystalline zeolite having a silica/alumina mole-ratio between about 2.5 and 10, and wherein said pellets were initially prepared by compressing into tablets an incompletely hydrated, powdered, microcrystalline ammonium form of said zeolite, followed by a calcining operation at temperatures above 700° F. to form a corresponding hydrogen zeolite, which comprises:
 (1) rehydrating said catalyst pellets to a water content of at least about 20% by weight,
 (2) ammoniating said hydrated pellets to substantial saturation with gaseous ammonia, and
 (3) recalcining the ammoniated pellets at a temperature between about 650° and 1,200° F. to thereby impart added mechanical strength and stability thereto.

2. A method as defined in claim 1 wherein said powdered zeolite comprises a catalyst containing additional Group VIII metal hydrogenating component.

3. A method as defined in claim 1 wherein said powdered zeolite is a molecular sieve of the Y crystal type having a silica/alumina mole-ratio between about 2.5 and 6.

4. A method as defined in claim 3 wherein at least about 10% of the ion-exchange capacity of said zeolite is satisfied by hydrogen ions prior to said ammoniation treatment.

5. A pelleted hydrocarbon conversion catalyst of improved mechanical strength comprising essentially a crystalline molecular sieve zeolite of the Y crystal type having a $SiO_2/Al_2O_3$ mole-ratio between about 2.5 and 6, and wherein at least about 10% of the ion-exchange capacity thereof is satisfied by hydrogen ions, said catalyst having been prepared and pretreated as defined in claim 1.

References Cited by the Examiner

UNITED STATES PATENTS

| | | | |
|---|---|---|---|
| 2,939,848 | 6/1960 | Malo et al. | 252—466 |
| 3,119,763 | 1/1964 | Haas et al. | 208—109 |
| 3,130,007 | 4/1964 | Breck | 202—455 |

FOREIGN PATENTS

| | | |
|---|---|---|
| 1,098,929 | 2/1961 | Germany. |

DELBERT E. GANTZ, *Primary Examiner.*

ALPHONSO D. SULLIVAN, *Examiner.*